I. DESY.
SULKY PLOW.
APPLICATION FILED MAR. 20, 1907.

932,376.

Patented Aug. 24, 1909.
2 SHEETS—SHEET 1.

Witnesses:

Inventor:
Irene Desy,
By
Attorneys

I. DESY.
SULKY PLOW.
APPLICATION FILED MAR. 20, 1907.

932,376.

Patented Aug. 24, 1909.
2 SHEETS—SHEET 2.

Witnesses:
H. T. McKeever.
J. W. Mister

Inventor:
Irene Desy,
By Saus Bagger Co
Attorneys

UNITED STATES PATENT OFFICE.

IRENE DESY, OF LEWISTOWN, MONTANA, ASSIGNOR OF ONE-THIRD TO SIMEON S. HOBSON AND ONE-THIRD TO DAMAS TAILLON, BOTH OF LEWISTOWN, MONTANA.

SULKY-PLOW.

932,376.  Specification of Letters Patent.  Patented Aug. 24, 1909.

Application filed March 20, 1907.  Serial No. 363,391.

*To all whom it may concern:*

Be it known that I, IRENE DESY, a citizen of the United States, residing at Lewistown, in the county of Fergus and State of Montana, have invented certain new and useful Improvements in Sulky-Plows, of which the following is a specification.

My invention relates to improvements in what may be specifically termed sulky plows. Its object, among other things, is to provide for accommodating the machine to plowing or working upon uneven ground, as well as elsewhere; to lessen draft upon the team; and to accomplish these purposes in a simple and economic way.

It consists of certain structural features or instrumentalities, including their arrangement, substantially as hereinafter particularly pointed out by the claims.

In the accompanying drawing illustrating the preferred embodiment of my invention—

Figure 1:
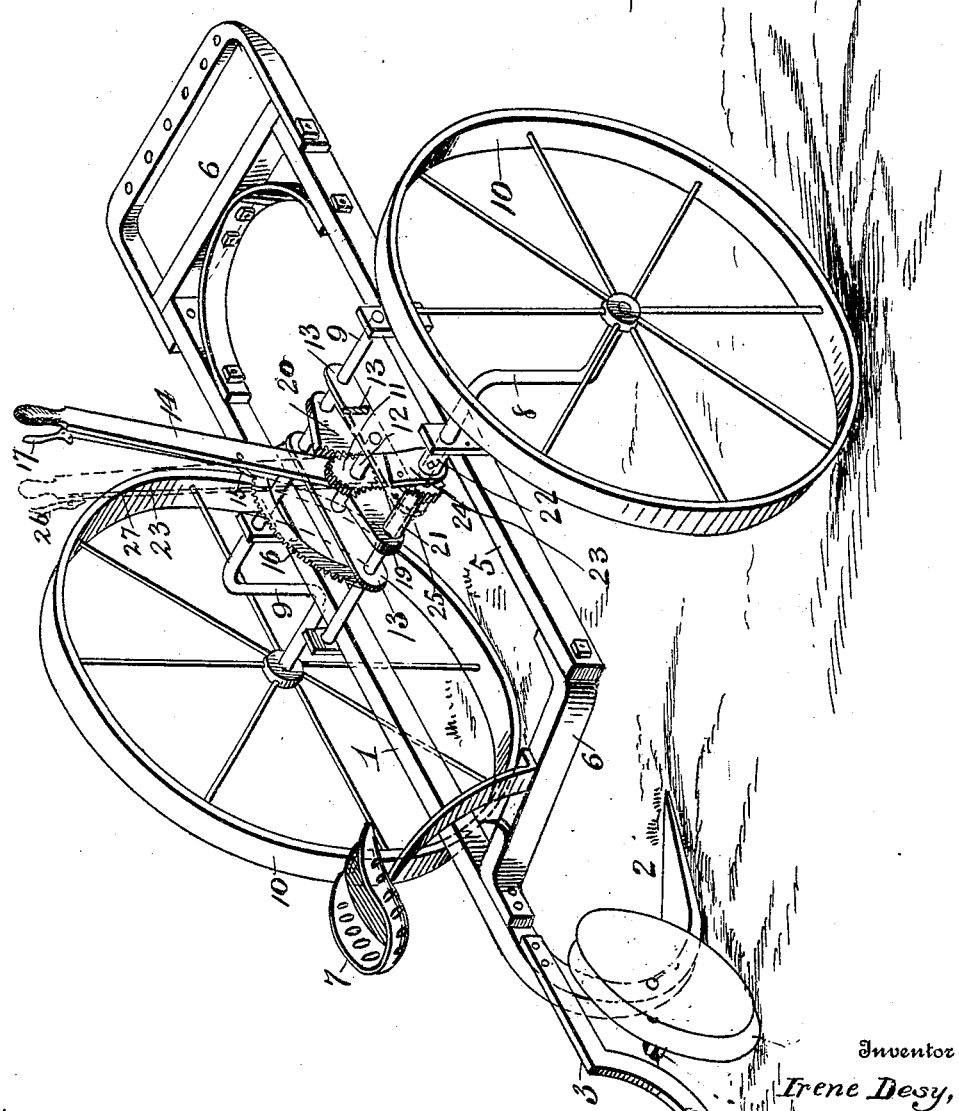
Figure 2:
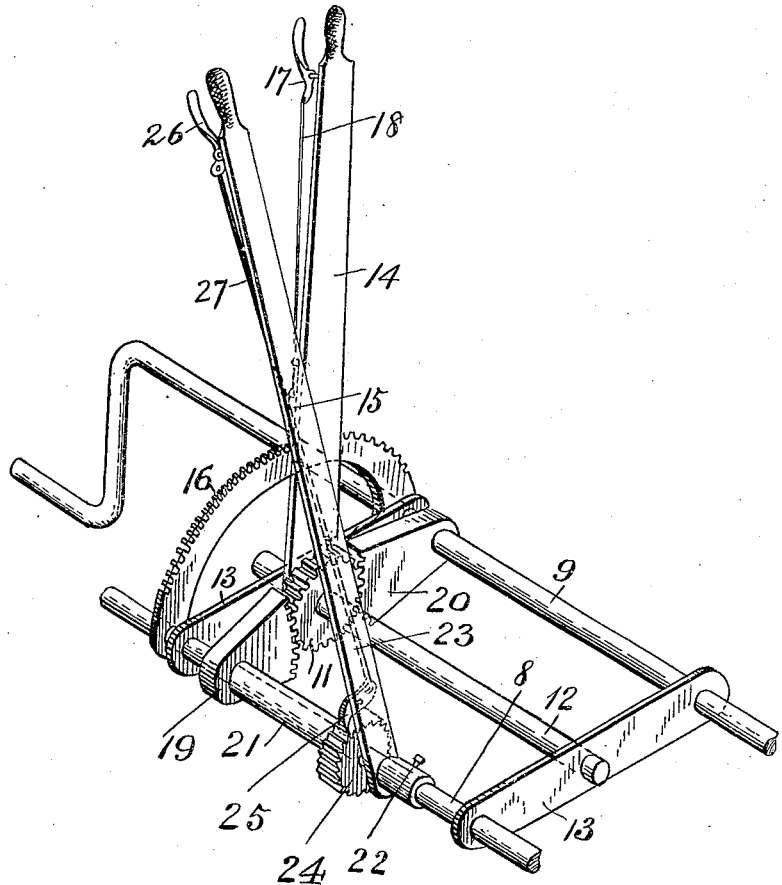

Figure 1 is a perspective view of the same showing its application. Fig. 2 is an enlarged fragmentary perspective view of the cranked axle adjusting mechanism.

In carrying out my invention, I employ a beam 1 suitably equipped with a furrow-forming plow 2 at its rear end, said beam having fixed or secured thereto, about where it is curved downward, at said end, a rearward-extending bar or arm 3 which has suitably swiveled thereto a caster-wheel 4 resting upon the ground or surface for the steadying of that end of the machine.

Parallel with the plow-beam 1, is an opposite lateral bar 5 secured to end bars 6, in turn secured to said plow-beam, the whole thus forming practically a frame, upon which at its rear-end is suitably mounted a driver's seat 7, while being adapted at its forward end for the suitable application of the draft.

Two cranked axles 8, 9, projecting from opposite sides of the frame, respectively, their projecting portions thus being arranged diagonally opposite to each other, are suitably journaled or applied to said frame preferably as shown, so as to permit of the turning of said axles in effecting the angular adjustment of their arms each carrying, or equipped with a wheel 10 for the transportation of the machine, one arranged forward of the center of and the other rearward of the center of the machine or frame.

A central pinion or gear-wheel 11 has its shaft 12 supported, and adapted to turn in transverse pieces or bars 13 connected to, or having passing therethrough the cranked axles 8, 9 for conveniently supporting said bars or pieces, and which pinion or gear-wheel has connected thereto and is under the control of a manually actuated lever 14 extending upward within easy reach of the driver for its movement when desired. Said lever is equipped with the well-known form of detent or pawl 15 engaging a rack 16 and pawl-actuated operating means 17, 18, for the suitable retention in position of said lever at the desired point of adjustment thereof, said rack being preferably secured to one of the bars 13.

Two toothed quadrants or sectors 19, 20 are suitably intergeared with the pinion or gear-wheel 11, and one secured to one cranked axle and the other secured to a sleeve 21 slipped loosely upon the other cranked axle and to the cranked axle 8, upon which said sleeve is arranged, is held by a set screw-equipped cuff 22, a lever 23 and upon said sleeve is fixed a small ratchet pinion 24 with which engages a pawl 25 carried by said lever. Said pawl is controlled by the equipment of the lever 23 with the usual finger-piece 26 connected by a rod 27 to said pawl. It is therefore noted that, should it be desired to synchronously adjust both of the cranked shafts or axles, as in accommodating the machine to plowing upon uneven ground or other contingencies, the lever 14 is grasped and suitably moved, when the intergeared pinion and quadrants or sectors, together with the sleeve 21 and ratchet 24 will be actuated which will, with the lever 23 thus coupled by the pawl 25 to said ratchet-pinion and accordingly connected to the rear cranked shaft, otherwise independent of said gear and quadrants, result in its actuation also simultaneously with the movement of the aforesaid parts. Should it be desired to actuate only one of said cranked shafts at a time, the set-screw of the cuff 22 at the lower end of the lever 23 is loosened, to release the latter from the cranked shaft bearing it, it being assumed that the pawl 25 has been retracted from the ratchet 24, when by suitably moving the lever 14 this may be effected as relates to the forward cranked shaft without affecting the rear cranked shaft. Or by still retaining the pawl 25 in its retracted position and again tightening the cuff 22 by its set-screw upon the rear axle, and grasping and suitably moving the lever 23, said axle may be accordingly moved or adjusted independently of the forward axle or shaft, as circumstances may require.

I claim—

1. A plow of the character described, employing wheel equipped cranked axles projecting from diagonally opposite points of the carrying frame, toothed sectors connected to said axles, a pinion geared therewith, and means for actuating said sectors and pinion.

2. A plow of the character described, employing wheel equipped cranked axles projecting from diagonally opposite points of the carrying frame, toothed sectors connected to said axles, a pinion geared therewith, a lever for actuating said geared pinion and sectors, one of said sectors being loosely sleeved upon one of said axles and the sleeve provided with a ratchet pinion, and a lever connection between said ratchet pinion and the axle bearing the same, which lever is adapted for disengagement from said ratchet pinion and to be fixed to said shaft for actuating the same separately.

3. A plow of the character described, employing wheel equipped cranked axles, toothed sectors connected to said axles, a pinion geared thereto, one sector fixed to one of said axles, and the other sector sleeved loosely upon the remaining axle, the sleeve carrying a ratchet pinion, and a lever connected to the latter axle and equipped with a suitably actuated pawl effective for engagement with said ratchet pinion.

In testimony whereof I have signed my name to this specification in the presence of two subscribing witnesses.

IRENE DESY.

Witnesses:
 Roy E. Ayers,
 Girard J. Smith.